US007727371B2

(12) United States Patent
Kennedy et al.

(10) Patent No.: US 7,727,371 B2

(45) Date of Patent: Jun. 1, 2010

(54) ELECTRODE APPARATUS FOR USE WITH A MICROFLUIDIC DEVICE

(75) Inventors: Colin B. Kennedy, Greenbrae, CA (US); Evelio Perez, San Pablo, CA (US)

(73) Assignee: Caliper Life Sciences, Inc., Mountain View, CA (US)

( * ) Notice: Subject to any disclaimer, the term of this patent is extended or adjusted under 35 U.S.C. 154(b) by 1113 days.

(21) Appl. No.: 11/245,878

(22) Filed: Oct. 7, 2005

(65) Prior Publication Data

US 2007/0080063 A1 Apr. 12, 2007

(51) Int. Cl.
*G01N 27/26* (2006.01)

(52) U.S. Cl. .......................... 204/601; 204/600; 422/99

(58) Field of Classification Search ............ 204/403.01, 204/412, 424, 600–605, 450–455; 435/287.1–287.3, 435/288.5–288.7, 6; 432/68.1, 100–102; 439/912, 912.1, 341, 59, 630, 374–381; 356/344; 422/82.01, 99, 100; 73/863.31, 863.32, 864.87
See application file for complete search history.

(56) References Cited

U.S. PATENT DOCUMENTS

| | | | | |
|---|---|---|---|---|
| 5,278,389 | A * | 1/1994 | Braman et al. | 219/125.1 |
| 5,858,195 | A | 1/1999 | Ramsey | |
| 5,955,028 | A | 9/1999 | Chow | |
| 5,955,029 | A | 9/1999 | Wilding | |
| 5,989,402 | A | 11/1999 | Chow | |
| 5,997,385 | A * | 12/1999 | Nishio | 451/56 |
| 6,504,757 | B1 | 1/2003 | Hollmer | |
| 6,811,668 | B1 | 11/2004 | Berndt et al. | |
| 2002/0110902 | A1 * | 8/2002 | Prosser et al. | 435/287.1 |
| 2003/0021725 | A1 * | 1/2003 | Unno et al. | 422/50 |
| 2003/0027345 | A1 * | 2/2003 | Friswell et al. | 436/49 |
| 2005/0279635 | A1 * | 12/2005 | Chow et al. | 204/601 |

OTHER PUBLICATIONS

Liang et al., Comparisons of disposable and conventional silver working electrode for the determination of iodide using high-performance anion-exchange chromatography with pulsed amperometric detection, Journal of Chromatography A, Jan. 7, 2005, 1085, 37-41.*

* cited by examiner

*Primary Examiner*—Nam X Nguyen
*Assistant Examiner*—Jennifer Dieterle

(57) ABSTRACT

An electrode alignment apparatus may be used with a microfluidic device for accurate and repeatable alignment of electrode pins with reservoirs on the microfluidic device. The apparatus includes a base unit and an electrode block assembly that are moveable with respect to each other from an open position to a closed position. The electrode block assembly includes an interface array that is coupled to an interface array platform such that the interface array is moveable with respect to the interface array platform in three dimensions.

37 Claims, 10 Drawing Sheets

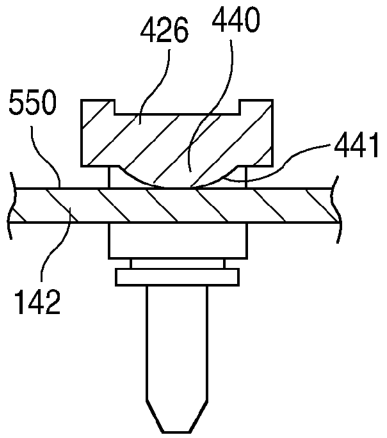
FIG. 6D
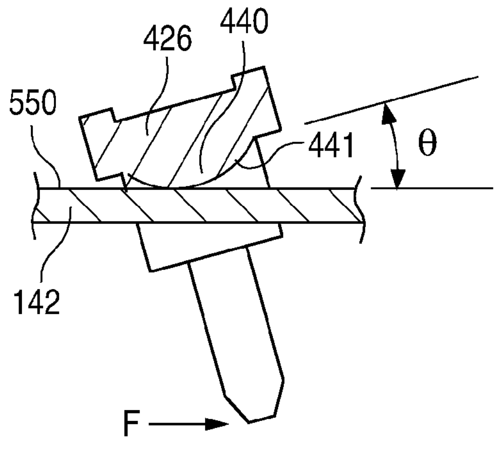
FIG. 6E
FIG. 7A
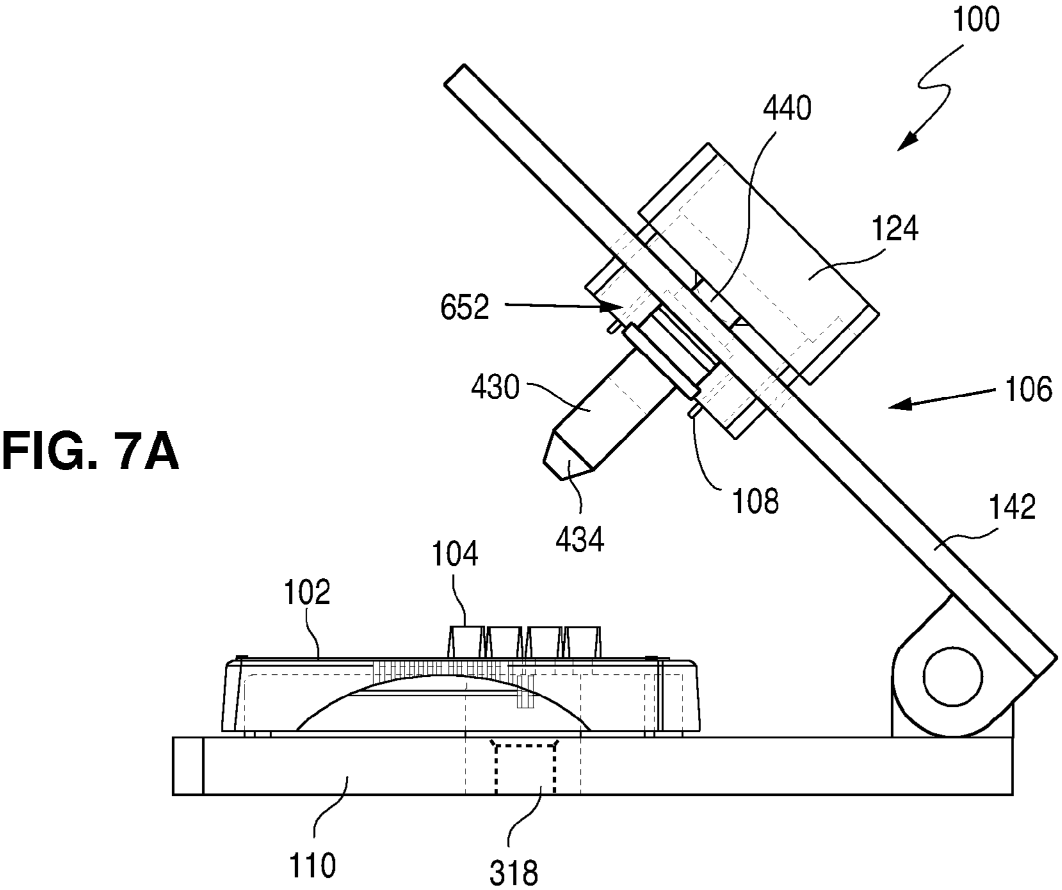

ELECTRODE APPARATUS FOR USE WITH A MICROFLUIDIC DEVICE

FIELD OF THE INVENTION

The present invention relates generally to systems and methods for performing chemical and biological analyses. More particularly, the present invention relates to an electrode alignment apparatus for use with a microfluidic device.

BACKGROUND OF THE INVENTION

Significant advancements in the fields of chemistry and biotechnology have been made due to the use of microfluidic technology. The term "microfluidic" generally refers to a system or device having channels and chambers that are fabricated with a cross-sectional dimension (e.g. depth, width, or diameter) of less than a millimeter. The channels and chambers typically form fluid channel networks that allow the transportation, mixing, separation and detection of very small quantities of materials. Microfluidics are particularly advantageous because they make it possible to perform various chemical and biochemical reactions, macromolecular separations, and the like with small sample sizes, in automatable, high-throughput processes.

The microfluidic channel networks are fabricated in a working part, or substrate, that can be made from a variety of materials, including polymers, quartz, fused silica, or glass. In some commercially available microfluidic devices, the substrate is integrated into the microfluidic device by bonding it with a UV-cured adhesive to a body, or caddy, which may be constructed from materials such as acrylic or thermoplastic. Since substrates may be very small, the integration of the substrate into a relatively larger body of a microfluidic device often makes the substrate much easier to handle and more practical for performing microfluidic analyses.

Reservoirs or wells are typically included on the body and located so that they are in fluid communication with the channel networks of the substrate. The wells provide relatively larger access when compared to the microfluidic channels included in the channel networks of the substrate. The size of the wells makes it easier for a user to load samples or other materials into the channel networks.

One of the significant advantages of using microfluidic devices is that only minute quantities of fluids, or other materials in solution, are required making it possible to perform a very large number of assays with limited sample material. Microfluidic devices are particularly beneficial for DNA testing (e.g., for DNA separations) since DNA samples are typically gathered in relatively small quantities.

Because of the small channel size and fluid volumes used in microfluidic devices, there are factors that influence fluid flow within microfluidic devices that are less important in macro-scale flows. For example, within microfluidic channels physical properties of fluids such as surface tension, viscosity and electrical charges can have a much greater impact on fluid mechanics than those properties have in macro-scale flows. As a result, phenomena such as electrophoresis, which may be insignificant in macro-scale flows, may be used to manipulate fluids in the fluid networks of microfluidic devices.

In order for electrophoresis to take place, an electric field must be applied to the fluid in a microfluidic channel. One way to apply such an electric field is through electrodes contacting the fluid in the microchannel. For example, electric fields could be generated within the channels of a microfluidic device by inserting electrodes with different electric potentials into reservoirs on the body of the microfluidic device.

There is a need for a device that is able to accurately and consistently align electrodes with reservoirs on microfluidic devices. There is a further need that such a device be designed so that it can be integrated into automated, high-throughput processes.

BRIEF SUMMARY OF THE INVENTION

Embodiments of the present invention include an electrode alignment apparatus for aligning electrodes with reservoirs on a microfluidic device. An alignment apparatus in accordance with the invention may comprise a base unit and an electrode block assembly. The base unit includes a device attachment region that can accommodate a microfluidic device. In some embodiments, the device attachment region may include components that orient the microfluidic device with respect to the electrode block assembly. The electrode block assembly includes an interface array and an interface array platform. The interface array comprises an electrode array constructed from a plurality of electrode pins. The interface array is coupled to the interface array platform in a manner that enables the array to be movable in three dimensions with respect to the interface array platform. In some embodiments, the interface array incorporates a resilient mounting assembly that couples the interface array to the interface array platform.

The base unit and the electrode block assembly are movable with respect to each other so that the electrode pins in the interface array are able to move into and out of engagement with reservoirs on a microfluidic device. The movement between the base unit and the electrode block assembly is repeatable and accurate so that the alignment and engagement of the electrode pins with the reservoirs is consistent. In some embodiments, the electrode block assembly is coupled to the base unit in a clamshell configuration in which the electrode block assembly is attached to the base unit along an axle that allows the electrode block assembly to rotate between an opened and a closed position.

Embodiments of the present invention include methods of aligning electrodes with reservoirs on a microfluidic device. These methods may include the steps of providing an electrode alignment apparatus. The apparatus comprises a base unit and an electrode block assembly configured so that they can be moved relative to each other between an open position and a closed position. The electrode block assembly comprises an interface array platform and an interface array that includes a plurality of electrode pins. Methods in accordance with the invention may further comprise the step of mounting a microfluidic device on a device attachment region of the base unit while the apparatus is in an open position. When the electrode block assembly is moved into the closed position, the interface array automatically adjusts its position with respect to the interface array platform so that the electrode pins align with reservoirs on the microfluidic device.

BRIEF DESCRIPTION OF THE FIGURES

These and other features, aspects and advantages of the present invention will become better understood with reference to the following description, appended claims, and accompanying figures.

FIGS. 6D and 6E are cross-sectional views taken along line B-B of FIG. 6A, showing the interface array in different orientations with respect to the interface array platform.

FIGS. 7A-7F are side views of the electrode alignment apparatus of FIG. 1 in various positions progressing from a fully open position to a fully closed position.

DETAILED DESCRIPTION OF THE INVENTION

The present invention is now described with reference to the figures where like reference numbers indicate identical or functionally similar elements. Also in the figures, the left most digit of each reference number corresponds to the figure in which the reference number is first used. While specific configurations and arrangements are discussed, it should be understood that this is done for illustrative purposes only. A person skilled in the relevant art will recognize that other configurations and arrangements can be used without departing from the spirit and scope of the invention.

Figure 1:
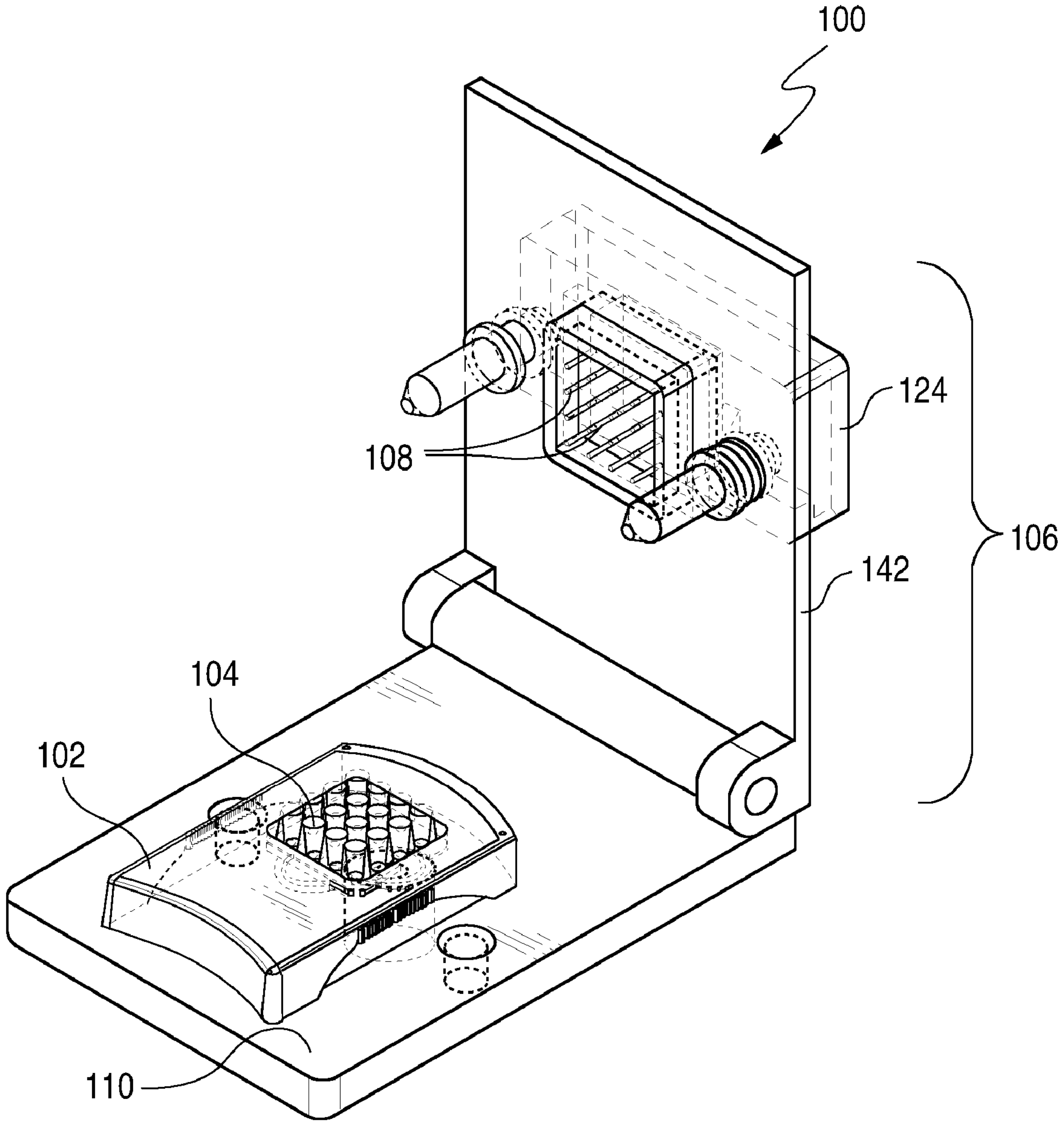
FIG. 1 is an isometric view of an embodiment of an electrode alignment apparatus in an open position.
Figure 2:
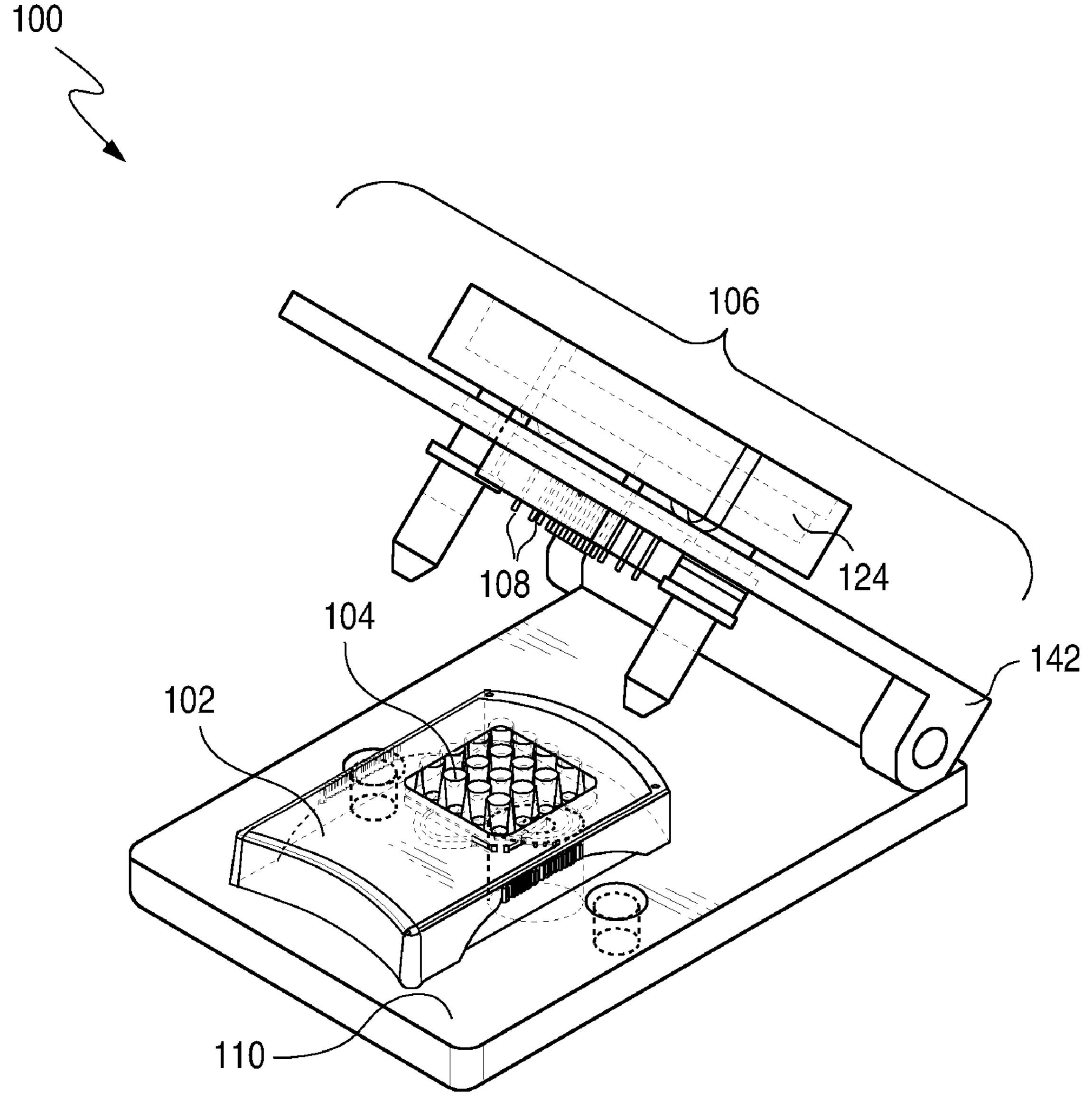
FIG. 2 is an isometric view of the electrode alignment apparatus of FIG. 1 in a partially closed position when compared to FIG. 1.

One embodiment of an electrode alignment apparatus 100 is illustrated in FIGS. 1 and 2. Electrode alignment apparatus 100 enables electrode pins 108 to be accurately and repeatedly aligned with reservoirs 104 on a microfluidic device 102. In this embodiment, electrode alignment apparatus 100 includes a base unit 110 and an electrode block assembly 106 that includes an interface array 124 and an interface array platform 142. Base unit 110 and electrode block assembly 106 move with respect to one another so electrode block assembly 106 can be moved between an open position and a closed position. More specifically, the electrode block assembly 106 is coupled to the base unit in a clamshell configuration in which the electrode block assembly is attached to the base unit along an axle 130 that allows the electrode block assembly 106 to rotate between an opened and a closed position. The movement of the electrode block assembly 106 in relation to the base unit 110 is shown and discussed below in more detail with reference to FIGS. 7A-7F. When the electrode alignment apparatus 100 is in the open position, the electrode block assembly 106 and the base unit 110 are spaced so that the electrode pins 108 are not inserted into reservoirs 104 on microfluidic device 102. In the closed position, base unit 110 and electrode block assembly 106 are located so that electrode pins 108 are inserted into reservoirs 104.

Another feature of the embodiment of FIGS. 1 and 2 is that the base unit 110 both supports and orients the microfluidic device 102. For the embodiment of FIGS. 1 and 2, the interface between the base unit 110 and the microfluidic device 102 can be seen in FIG. 3, which shows the base unit 110 without a microfluidic device overlying it. A device attachment region 314 of the base unit 110 supports a microfluidic device so that the microfluidic device can be easily set on the base unit 110 in a consistent position. In general, a device attachment region in accordance with the invention is configured to compliment one or more features on the body of a microfluidic device so that the device attachment region can only accommodate a microfluidic device in a single orientation. For example, in the embodiment shown in FIG. 3, the device-mounting region 314 is a raised platform extending upwardly from a top surface 312 of the base unit 110. The raised platform is shaped to correspond to a similarly shaped recess in the bottom of microfluidic device 102. The asymmetrical shapes of the raised platform 314 and the recess in the microfluidic device 102 ensure that the microfluidic device 102 can only be placed onto the device mounting region 314 in one orientation. In other embodiments, the device attachment region could be a recess in the base unit into which an asymmetrically shaped microfluidic device can fit in only one orientation.

Figure 3:
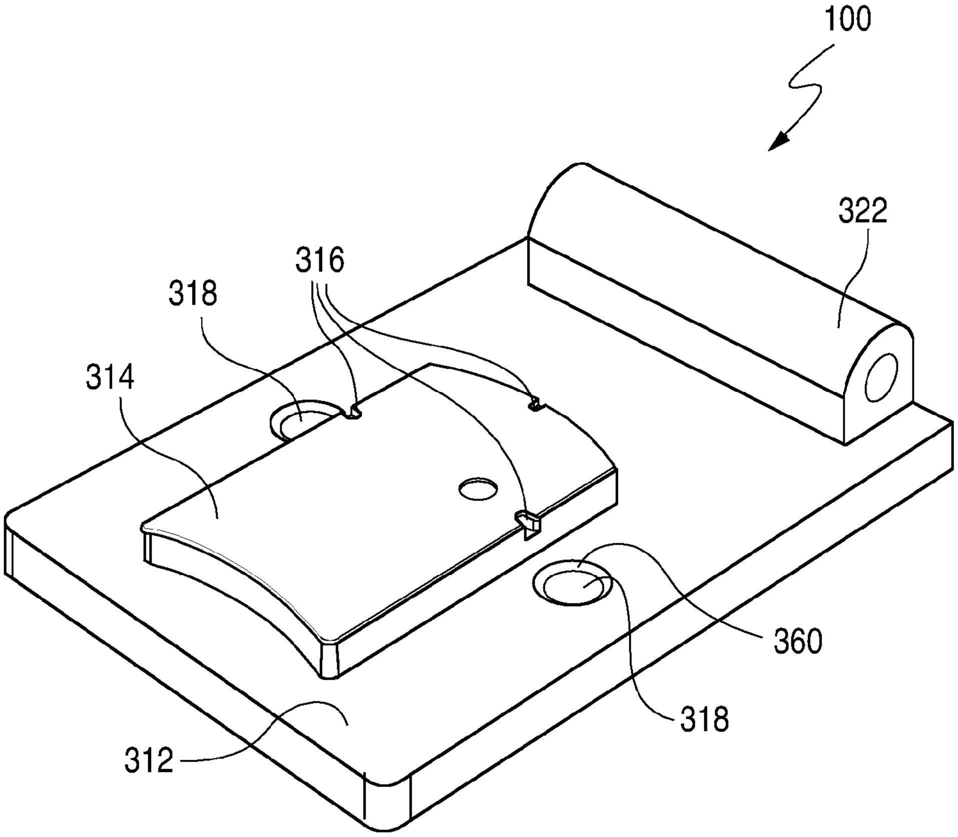
FIG. 3 is an isometric view of the base unit of the electrode alignment apparatus of FIG. 1.

Precise control of the position of a microfluidic device 102 installed on base unit 110 requires precise control of the tolerances of the dimensions of the recess 350 in the microfluidic device 102. Superior control over the position of the microfluidic device 102 on the base unit 110, however, may be achieved through the use of registration features on the microfluidic device 102. In embodiments involving such registration features, the device-mounting region on the base unit will comprise one or more features complementary to the registration features on the microfluidic device. For example, if the registration features on the microfluidic device are protrusions or recesses, then the device mounting region will have corresponding recesses or protrusions that accommodate the registration features on the microfluidic device in such a way that the microfluidic device can be placed onto the device-mounting region in only one orientation. In the embodiment of FIG. 3, the registration features on the microfluidic device are protrusions, one or more registration features 316 may be provided having dimensions with closely controlled tolerances to alleviate the need to have all dimensions of device attachment region 314 closely controlled, or to create a device attachment region 314 that is compatible with multiple microfluidic device designs. Registration features 316 may be configured to engage specific features of microfluidic device 102. Since the registration features on a device attachment region and the corresponding features on the microfluidic device are small, it is easier to control the absolute dimensions.

Base unit 110 also includes base alignment features such as alignment holes 318. The base unit also includes hinge member 322 that encloses axle 130. As will be discussed in greater detail below, alignment holes 318 are provided to engage alignment features included in the electrode block assembly and thereby assure the alignment of electrode pins 108 with reservoirs 104 in microfluidic device 102. Hinge member 322, which will also be described in greater detail below, is one type of coupling assembly that may be used to moveably couple electrode block assembly 106 with base unit 110.

As a further alternative, base unit 110 may also include devices for controlling and monitoring temperature, such as heating devices and temperature sensors (not shown). Heating devices such as strip heaters or heater wires would be suitable but the device may be any heating device known in the art. The heating device may be attached to any surface of base unit 110 or integrated into base unit 110. One or more temperature sensors may also be coupled to base unit 110. One example of a suitable temperature sensor would be a thermocouple.

Although base unit 110 is shown as a plate, it may be constructed as any structure capable of supporting device attachment region 314. Furthermore, device attachment region 314 may be an integral part of base unit 110, as shown, or a separate structure that is fixedly coupled to base unit 110.

Base unit 110 may be constructed from any material known in the art to be compatible with microfluidic devices and testing. Base unit 110 may be constructed of a metal or a polymer. Base unit 110 may also be machined or molded into a desired shape.

Figure 4A:
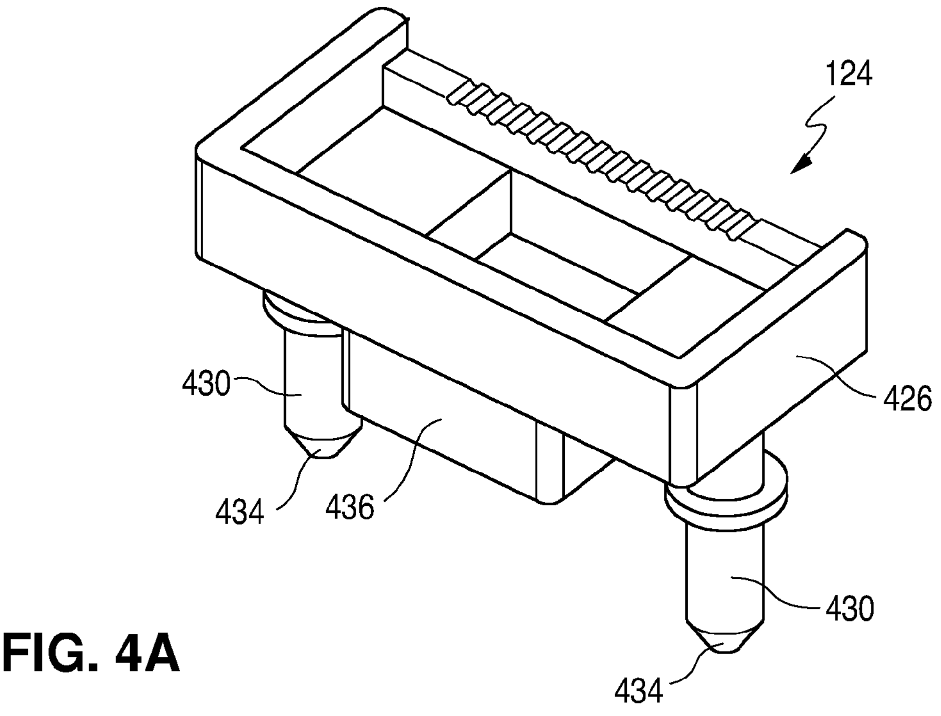
FIGS. 4A and 4B are isometric views, of the top and bottom, respectively, of an interface array of the electrode alignment apparatus of FIGS. 1 and 2.
Figure 4B:
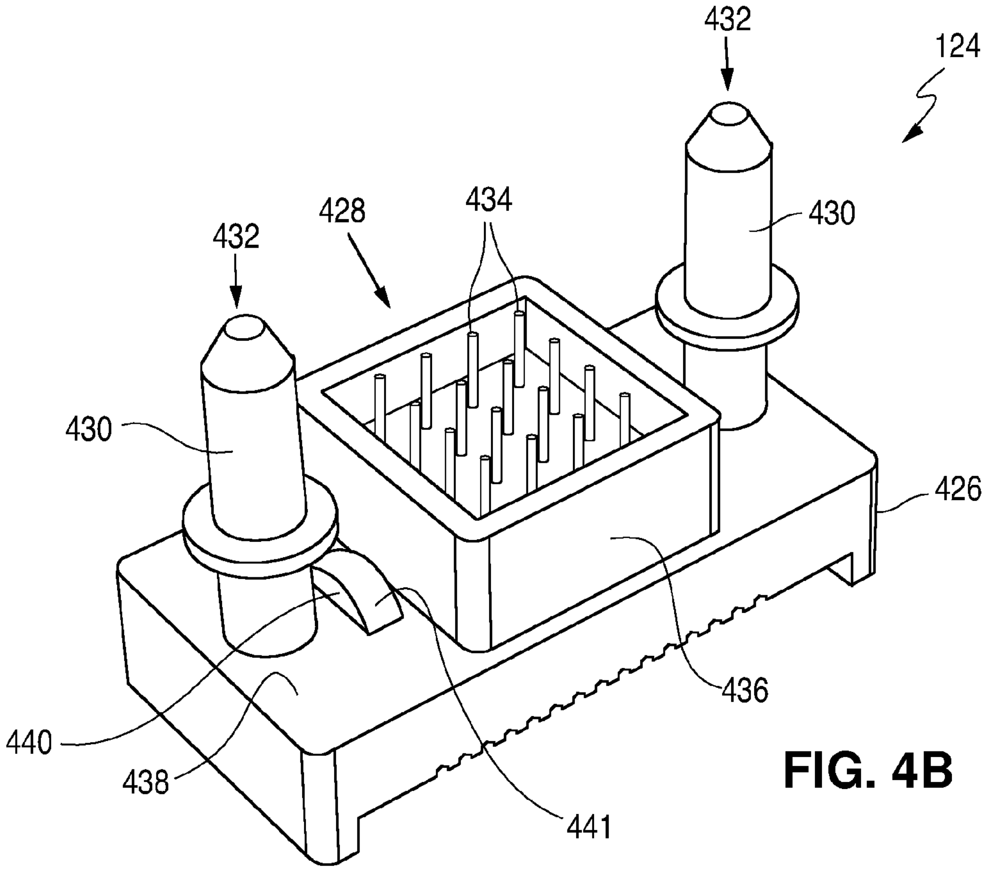

As shown in FIGS. 4A and 4B, interface array 124 includes an electrode block 426 and an electrode array 428 that is constructed from a plurality of electrode pins 108. Electrode block 426 is the main structural component of interface array 124. Electrode block 426 supports electrode array 428 and may also support alignment features, such as alignment pins 430, and a depth stop member 436.

In the exemplary embodiment, electrode block 426 is generally a rectangular block. Electrode array 428 extends from a bottom surface of electrode block 426. In addition, alignment pins 430 extend from bottom surface 438 and are located on either side of electrode array 428. Depth stop member 436 is a wall that-circumscribes electrode array 428 and extends from bottom surface 438 to a predetermined length. Depth stop member 436 is configured to interact with a surface of microfluidic device 102 to limit the depth that electrode pins 108 are inserted into reservoirs 104.

In another aspect of electrode block 426, rocker members 440 extend from bottom surface 438 and have an arcuate bearing surface 441. When interface array is coupled to interface array platform 142, as described below, arcuate bearing surface 441 of each rocker member 440 contacts interface array platform 142. The contact between interface array platform 142 and arcuate bearing surfaces 441 allow electrode block 426 to rock smoothly with respect to interface array platform 142.

Electrode block 426 may a single piece or assembled from multiple components. In either embodiment, electrode block 426 may be molded or machined. Alignment pins 430 and rocker members 440 may be integral parts of electrode block 426, or they may be a separate pieces. For example, electrode block 426, alignment pins 430, and rocker members may be molded from polypropylene in one piece, as shown in FIGS. 4A and 4B.

Figure 5:
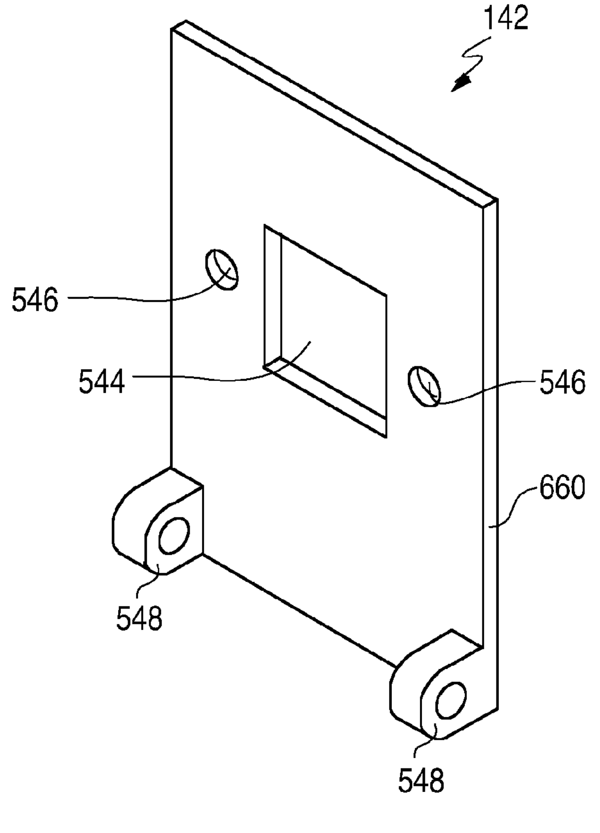
FIG. 5 is an isometric view of an interface array platform of the electrode alignment apparatus of FIGS. 1 and 2.

Interface array platform 142 is provided to support interface array 124 so that interface array 124 is movable in three dimensions with respect to interface array platform 142. As shown in the embodiment of FIG. 5, interface array platform 142 is generally a flat plate with an electrode array aperture 544 and a pair of alignment pin apertures 546.

Interface array platform 142 may also include hinge members 548 that compliment hinge member 322 of base unit 110 to allow interface array platform 142 to be hinged with base unit 110. The hinge allows electrode block assembly 106 to be moved with respect to base unit 110 between an open position and a closed position. Although the illustrated embodiment utilizes a hinge to couple electrode block assembly 106 with base unit 110, the two may alternatively be directly coupled through other forms of linkage, as would be apparent to one skilled in the relevant art.

As a further alternative, electrode block assembly 106 may be indirectly coupled to base unit 110. For example, base unit 110 could be mounted to an additional support structure and electrode block assembly 106 could be coupled to the same or a different support structure.

The structure of interface array platform 142 need not be limited to a flat plate. Interface array platform 142 may be any structure capable of supporting interface array 124 in the manner described. Interface array platform 142 may be made of any metal or polymer known in the art to be compatible with microfluidic devices and processes.

Base alignment features may be included on base unit 110, and array alignment features may be included on interface array 124 to assure the orientation of interface array 124 as electrode alignment device 100 is moved from the open position to the closed position. The alignment features assure that electrode pins 108 of interface array 124 are aligned with respect to reservoirs 104 on microfluidic device 102 as interface array 124 approaches microfluidic device 102.

In one embodiment, as shown, the alignment features include a pair of alignment pins 430 on interface array 124 and a complementary pair of alignment holes 318 on base unit 110. Alignment pins 430 are configured to engage alignment holes 318 when electrode alignment device 100 is in the closed position.

Features may be added to alignment holes 318 and alignment pins 430 to further aid engagement of the alignment features when electrode alignment device approaches the closed position. For example, the top edge of alignment holes 318 may include lead-in chamfers 350 to help guide alignment pins 430 into alignment holes 318. In addition, or as an alternative, tip chamfers 434 may be included at alignment pin tips 432 also to help guide alignment pins 430 into alignment holes 318.

Interface array 124 is coupled to interface array platform 142 so that it is movable in three dimensions with respect to interface array platform 142. As alignment pins 430 become progressively more engaged with alignment holes 318, the motion of interface array 124 becomes progressively more restricted in every direction except the direction corresponding to the length of electrode pins 108. As a result, the movement of interface array 124 generally becomes linear as electrode alignment apparatus 100 approaches the closed position even though it is attached to interface array platform 142 which generally moves along an arcuate path. The ability of interface array 124 to be movable in three dimensions with respect to interface array platform 142 makes it possible for interface array 124 and interface array platform 142 to move along different paths while being coupled.

As shown in FIGS. 6A-6E, interface array 124 may be coupled to interface array platform 142 by a resilient mounting assembly 652. Resilient mounting assembly 652, includes a pair of resilient members 654 mounted on alignment pins 430 and a pair of sleeve stop members 656. Alignment pins 430 extend through alignment pin apertures 546 of interface array platform 142. Resilient members 654 are positioned on alignment pins 430 and sleeve stop members 656 are coupled to alignment pins 430 to limit movement of resilient members 654 along a longitudinal axis of alignment pins 430. Interface array platform 142 is located between rocker members 440 and resilient members 654. In that position, arcuate bearing surfaces 441 contact top surface 550 of interface array platform 142 while top surfaces 655 of resilient members 654 contact bottom surface 543 of interface array platform 142.

As illustrated, resilient members 654 are shown as tubular sleeves slid onto alignment pins 430. Resilient members 654 may be constructed from any resilient material that is compatible with microfluidic devices and analyses, such as rubber. Alternatively, the resilient members may be designed such that the structure is inherently resilient, such as conventional springs. It is not necessary that resilient members be coupled to the alignment pins. For example, resilient mounting assembly may be entirely separate from alignment pins 430 or any other alignment feature.

Sleeve stop members 656 are shown combined with alignment pins 430 to restrict movement of resilient members 654. Sleeve stop members 656 may be any device capable of restricting resilient members 654 from sliding off of alignment pins 430 such as snap rings or collars fixedly coupled to alignment pins 430. Alternatively, if alignment pins 430 are separate pieces coupled to electrode block 124, shoulders that are integrated into alignment pins 430 may function as sleeve stop members 656. In such an embodiment, resilient members 654 would be mounted on the alignment pins 430 before the alignment pins are mounted on the electrode block 124.

Figure 6A:
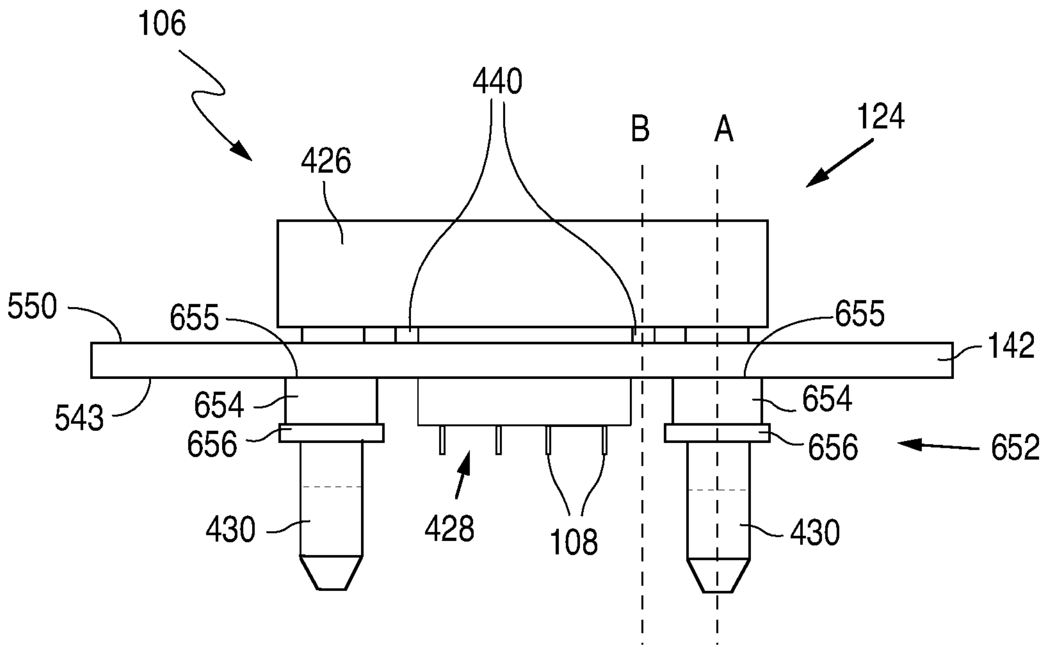
FIG. 6A is front view of an electrode block assembly of the electrode alignment apparatus of FIGS. 1 and 2.
Figure 6B:
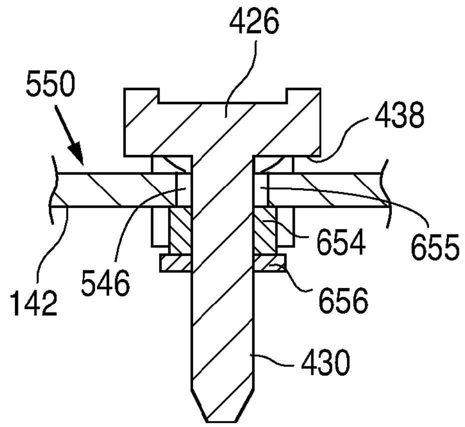
FIGS. 6B and 6C are cross-sectional views taken along line A-A of FIG. 6A, showing the interface array in different orientations with respect to the interface array platform.

FIGS. 6B and 6D illustrate the interaction between interface array 124 and interface array platform 142 when there is no force acting on alignment pins 430, such as when electrode alignment apparatus 100 is in the open position. In particular, FIG. 6B is a cross-sectional view of electrode block assembly 106 taken along line A-A of FIG. 6A. It illustrates the configuration of resilient member 654 and sleeve stop member 656 in resilient mounting assembly 652 in the zero stress condition. It also shows alignment pin 430 passing through alignment pin aperture 546. In the zero stress condition, bottom surface 438 of electrode block 426 is generally parallel to top surface 550 of interface array platform 142.

The only body restricting movement of interface array 124 with respect to interface array platform 142 is resilient mounting assembly 652. As is apparent in the figure, alignment pin aperture 546 is sized slightly larger than the diameter of alignment pin 430 so interface array 124 is allowed to move a small amount in the plane of interface array platform 142. Similarly, interface array 124 is free to move a small amount in the direction of the longitudinal axis of alignment pins 430 due to the resilience of resilient members 654. Therefore, interface array 124 is free to move in three dimensions with respect to interface array platform 142.

In addition, FIG. 6D is a cross-sectional view of electrode block assembly 106 taken along line B-B of FIG. 6A also in the zero stress condition. In that figure, the interface between rocker member 440 and interface array platform 142 is illustrated. It is clear that arcuate bearing surface 441 of rocker member 440 contacts top surface 550 of interface array platform. Spring force caused by compression of resilient member 654 has a tendency to maintain contact between top surface 550 of interface array platform 142 and arcuate bearing surface 441 of rocker member 440.

Figure 6C:
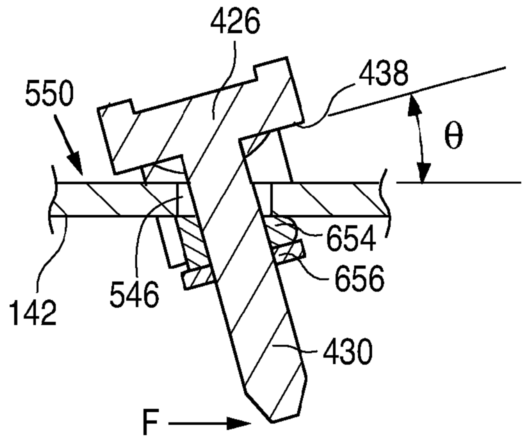

FIGS. 6C and 6E are cross-sectional views showing the interface between interface array 124 with interface array platform 142 when a force F is exerted on alignment pin 430. Such a force would be exerted on alignment pins 430 by alignment holes 318 due to the different paths of travel of interface array 124 and interface array platform 142, as previously described. The cross-sectional views shown in FIGS. 6C and 6E correspond to the cross-sectional views of FIGS. 6B and 6D respectively.

Interface array 124 is free to move a small amount in reaction to force F. Under the influence of force F, resilient member 654 is caused to compress on one side of alignment pin 430 as shown in FIG. 6C. Simultaneously, interface array 124 rotates and maintains sliding contact between arcuate bearing surface 441 of rocker member 440 and top surface 550 of interface array platform 142 as shown in FIG. 6E. As a result, bottom surface 438 of electrode block 426 becomes oriented at an angle θ (where θ is greater than zero) with respect to top surface 550 of interface array platform 142 under the influence of force F.

FIGS. 7A-7F are side views of one embodiment of the electrode alignment device shown in sequential positions ranging from the open position to the closed position. As will be evident from the figures, the apparatus allows substantially linear insertion of electrode pins 108 into reservoirs 104 despite the arcuate movement of interface array platform 142.

FIG. 7A shows electrode alignment apparatus 100 in the open position. Microfluidic device 102 is shown mounted on base unit 110. In the open position, interface array platform 142 is rotated with respect to base unit 110 such that interface array 124 is spaced apart from base unit 110 and microfluidic device 102.

Figure 7B:
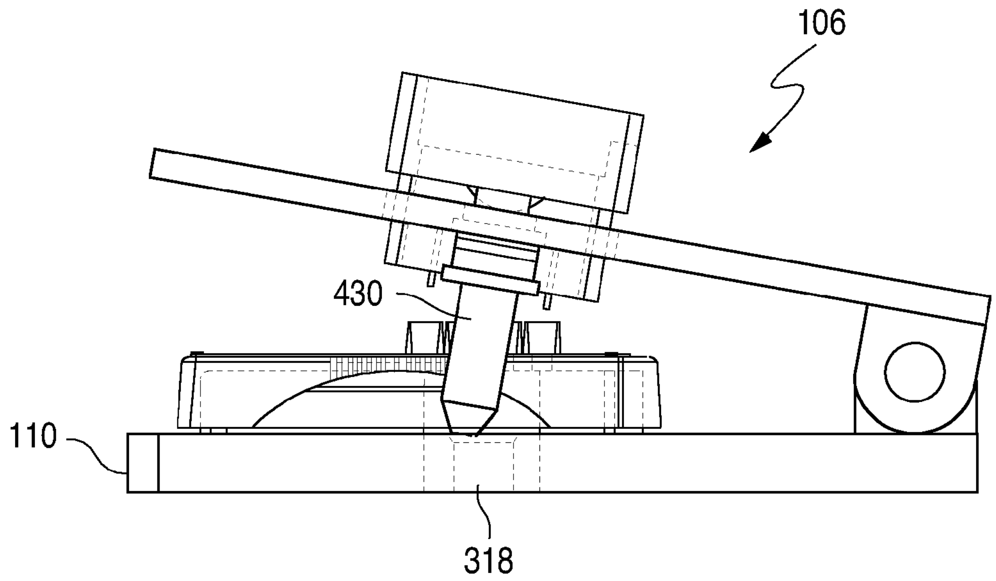

In FIG. 7B electrode alignment apparatus 100 is shown in an intermediate position between the open position and the closed position. In that position, electrode block assembly 106 has been rotated toward base unit 110. It can be seen that at that position, alignment pins 430 are in contact with alignment holes 318 but the features have not yet become engaged. FIG. 7B also shows a benefit of including lead-in chamfers 350 and tip chamfers 434 on alignment holes 318 and alignment pins 430 respectively. Lead-in chamfers 350 and tip chamfers 434 allow for engagement of alignment pins 430 with alignment holes 318 when there is a greater amount of misalignment.

Figure 7C:
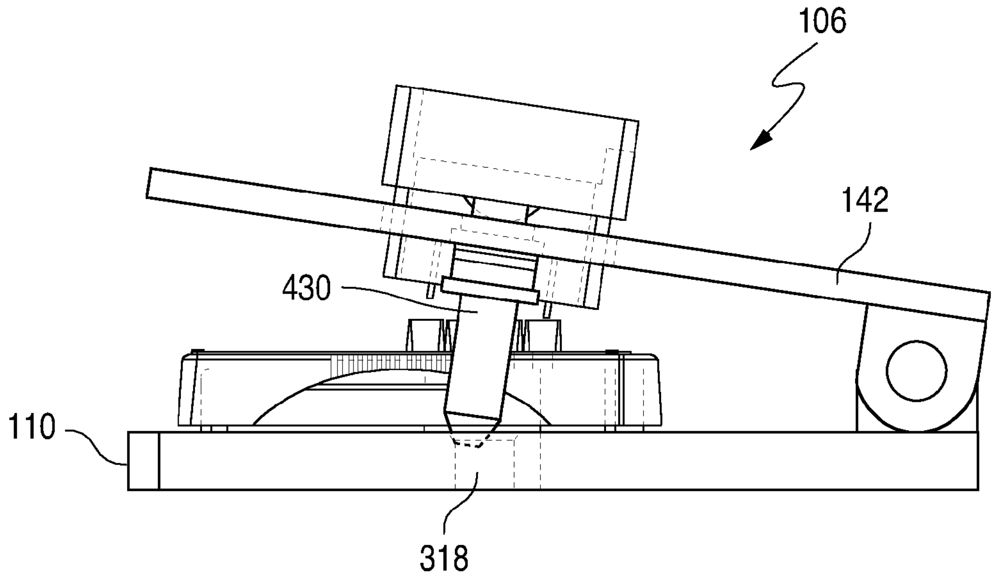
Figure 7D:
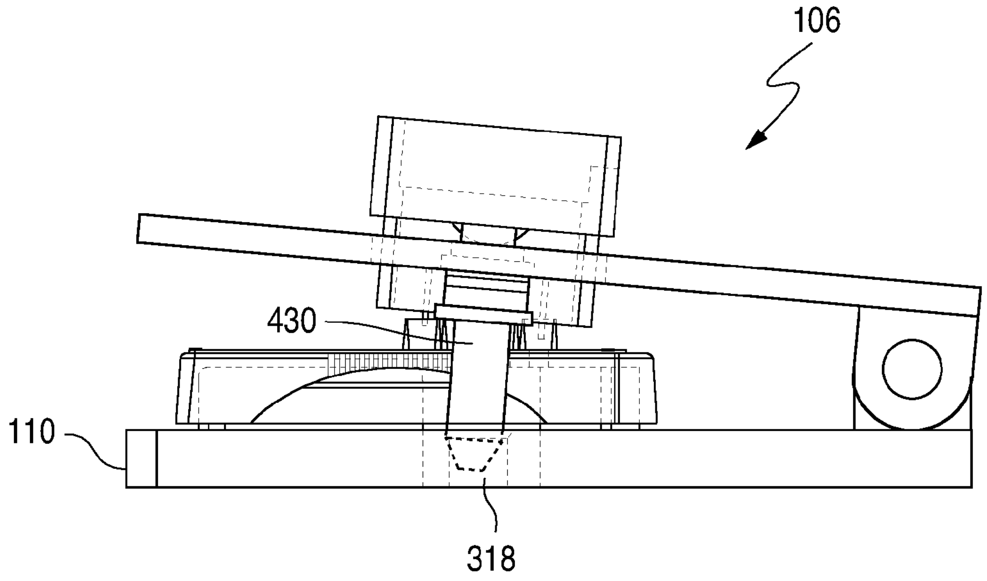

During the continued rotation of electrode block assembly 106 toward the closed position, as shown in FIGS. 7C and 7D, alignment pins 430 engage alignment holes 318. In the two positions shown, the differing paths of interface array platform 142 and interface array 124 causes tip chamfers 434 to slide along lead-in chamfers 350 and alignment holes 318 to exert force F upon alignment pins 430. As alignment pins 430 further engage with alignment holes 318 the magnitude of force F increases.

Figure 7E:
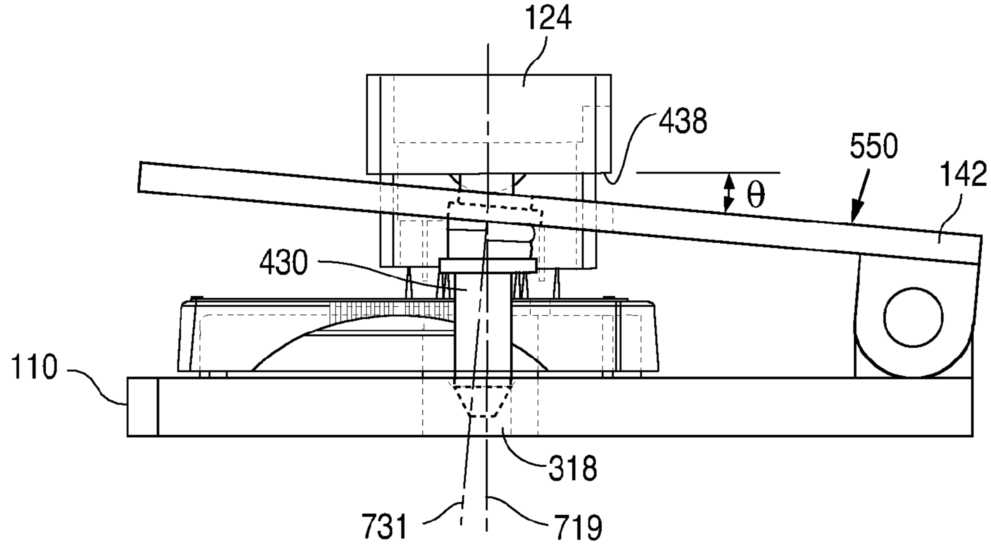

FIG. 7E shows a further engaged position where the longitudinal axis 731 of alignment pins 430 has become substantially coincident with the longitudinal axis 719 of alignment holes 318. At this position, interface array 124 has rotated with respect to interface array platform such that bottom surface 438 of electrode block 426 is at an angle θ, where θ is greater than zero, with respect to top surface 550 of interface array platform 142.

Figure 7F:
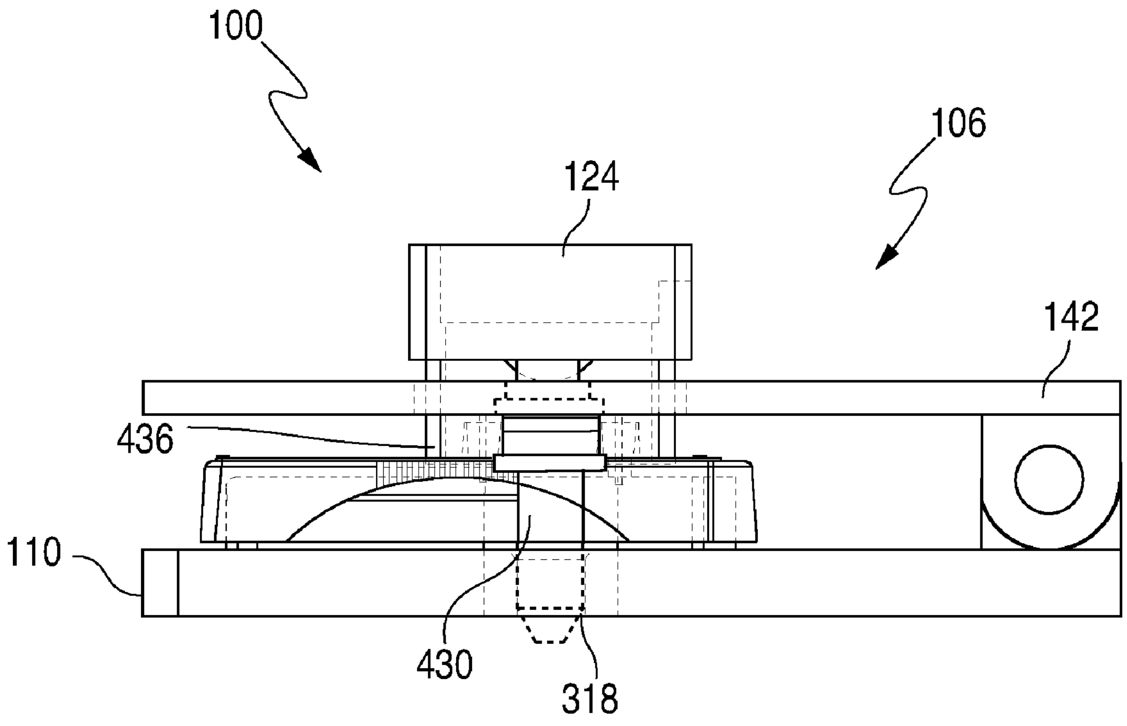

As electrode block assembly 106 is further rotated with respect to base unit 110, alignment pins 430 become fully engaged with alignment holes 318. The depths of alignment pins 430 in alignment holes 318 and electrode pins 108 in reservoirs 104 are controlled by depth stop member 436. When depth stop member 436 contacts microfluidic device 102, as shown in FIG. 7F, electrode alignment apparatus 100 is in the closed position and electrode pins are aligned and fully inserted into reservoirs 104 on microfluidic device 102.

Figure 8:
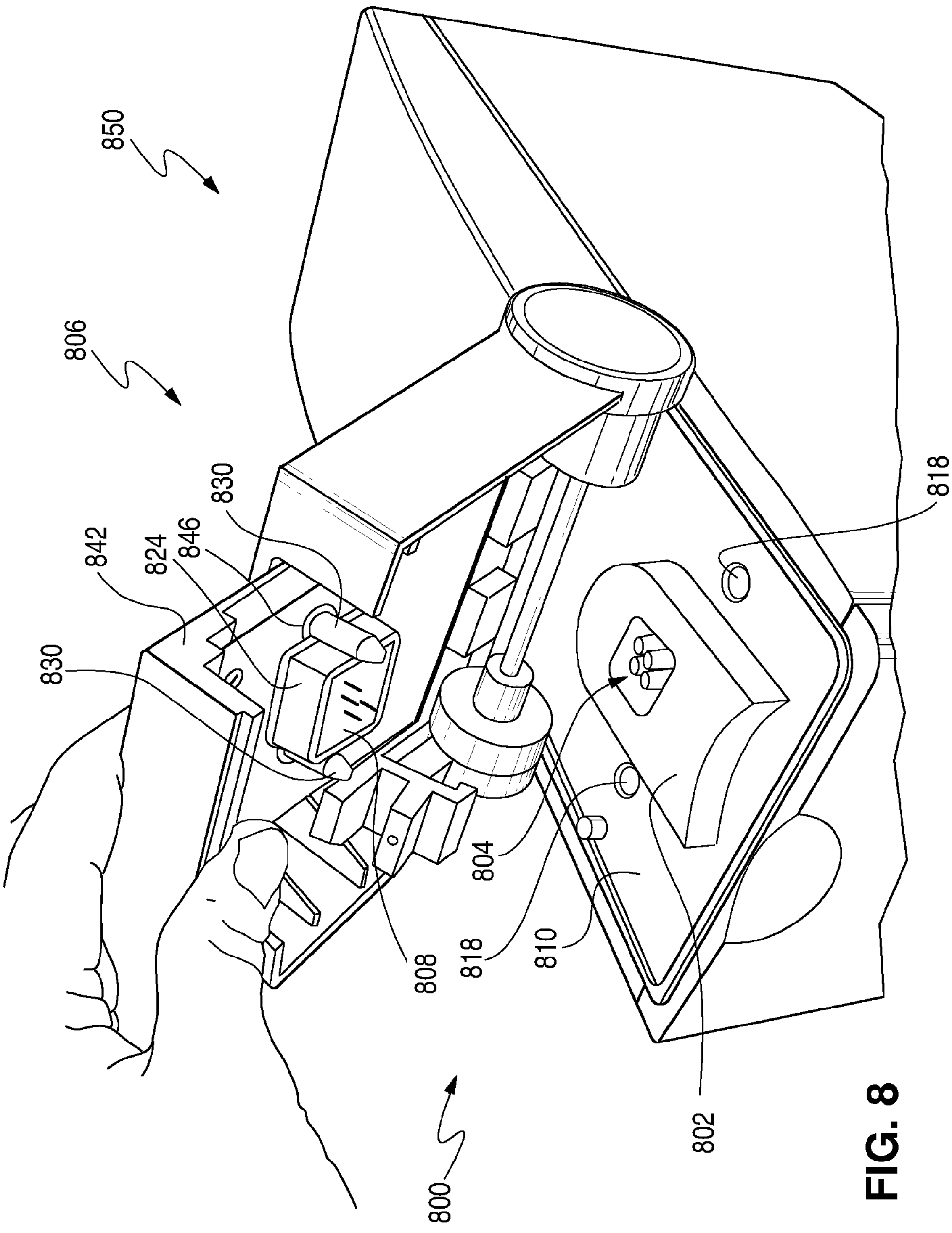
FIG. 8 shows an embodiment of the present invention integrated into a larger system used for performing microfluidic analyses.

Although the embodiment described above includes an electrode alignment apparatus that is an independent unit, the components of the electrode alignment apparatus may be integrated into a larger system such as the system shown in FIG. 8.

As shown, the components of an electrode alignment apparatus 800 are integrated into an equipment housing 850. Electrode alignment apparatus 800 generally includes an electrode block assembly 806 including an interface array platform 842, an interface array 824, and a base unit 810. Similar to the embodiments previously described, interface array platform 842 is hinged with respect to base unit 810 so that electrode block assembly 806 may be moved with respect to base unit 810 between an open position and a closed position.

A pair of alignment pins 830 extends through a pair of alignment pin apertures 846 of interface array platform 842. Alignment pins 830 are configured to engage a pair of alignment holes 818 in base unit 810.

In use, a chip 802 is mounted on base unit 810 and electrode block assembly 806 is moved with respect to base unit 810 into the closed position. In the closed position, alignment pins 830 engage alignment holes 818 and electrodes 808 are thereby aligned with reservoirs 804 on chip 802. The engagement between alignment pins 830 and alignment holes 818 causes interface array 824 to be oriented such that electrodes 808 are properly aligned with reservoirs 804 prior to insertion of electrodes 808 into reservoirs 804.

Although FIG. 8 shows a system that includes a single base unit, in another embodiment, the electrode alignment apparatus could be included in a system that utilizes a base unit assembly. In such a system, the base unit assembly could include multiple base units and would allow the multiple base units to be transported within a larger system and engaged with one or more electrode block assemblies.

Furthermore, it is not necessary that purely mechanical alignment mechanisms be utilized. For example, sensors may be included in combination with electromechanical actuators to control the movement of interface array and to assure alignment between electrode pins and reservoirs on a microfluidic device.

As a still further alternative, alignment features may be included on the microfluidic device rather than base unit. Alignment features on interface array would then engage with the alignment features of the microfluidic device to align the electrode pins. For example, with regard to the embodiment shown, depth stop member 436 could engage the outer surfaces of reservoirs 104 for alignment.

While the invention has been particularly shown and described with reference to preferred embodiments thereof, it will be understood by those skilled in the art that they have been presented by way of example only, and not limitation, and various changes in form and details can be made therein without departing from the spirit and scope of the invention. Thus, the breadth and scope of the present invention should not be limited by any of the above-described exemplary embodiments, but should be defined only in accordance with the following claims and their equivalents.

The foregoing description of the specific embodiments will so fully reveal the general nature of the invention that others can, by applying knowledge within the skill of the art, readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance presented herein, in combination with the knowledge of one of ordinary skill in the art.

What is claimed is:

1. An electrode alignment apparatus, comprising:

a base unit including a microfluidic device attachment region; and an electrode block assembly including an interface array platform and an interface array, said interface array including an electrode block and a plurality of electrode pins, wherein the interface array is coupled to the interface array platform such that the interface array is movable in three dimensions with respect to the interface array platform.

2. The electrode alignment apparatus of claim 1, wherein the electrode block assembly includes an electrical power supply electrically coupled to the electrode pins.

3. The electrode alignment apparatus of claim 1, wherein the base unit includes a base alignment feature and the interface array includes a corresponding array alignment feature.

4. The electrode alignment apparatus of claim 3, wherein the base alignment feature comprises a pair of alignment holes and the array alignment feature comprises a pair of alignment pins.

5. The electrode alignment apparatus of claim 1, wherein the base unit includes a heater.

6. The electrode alignment apparatus of claim 1, wherein the electrode block is constructed of polypropylene.

7. The electrode alignment apparatus of claim 1, wherein the interface array is coupled to the interface array platform by a resilient mounting assembly.

8. The electrode alignment apparatus of claim 1, further comprising a coupling assembly disposed between the base unit and the electrode block assembly.

9. The electrode alignment apparatus of claim 8, wherein the coupling assembly is a hinge.

10. The electrode alignment apparatus of claim 1, wherein the base unit is a plate.

11. The electrode alignment apparatus of claim 1, wherein the microfluidic device attachment region is a raised platform that extends from a top surface of the base unit.

12. The electrode alignment apparatus of claim 11, wherein a registration feature is disposed on the raised platform.

13. The electrode alignment apparatus of claim 1, wherein the electrode bock assembly includes a stop feature.

14. The electrode alignment apparatus of claim 1, wherein the base unit includes a stop feature.

15. An electrode alignment apparatus, comprising: a base unit comprising a microfluidic device attachment region; and an electrode block assembly including an interface array platform, an interface array including an electrode block and a plurality of electrode pins, and a resilient mounting assembly, wherein the interface array is movable in three dimensions with respect to the interface array platform.

16. The electrode alignment apparatus of claim 15, wherein the base unit includes an electrical power supply electrically coupled to the electrode pins.

17. The electrode alignment apparatus of claim 15, wherein the base unit includes an alignment feature and the interface array includes a corresponding alignment feature.

18. The electrode alignment apparatus of claim 17, wherein the base unit alignment feature is a pair of alignment holes and the interface array alignment feature is a pair of alignment pins.

19. The electrode alignment apparatus of claim 18, wherein the resilient mounting assembly further comprises:

a resilient member mounted on each alignment pin; and a sleeve stop member coupled to each alignment pin.

20. The electrode alignment apparatus of claim 19, wherein the resilient member is a spring.

21. The electrode alignment apparatus of claim 19, wherein the resilient member is a polymer sleeve.

22. The electrode alignment apparatus of claim 19, wherein the sleeve stop member is a snap ring.

23. The electrode alignment apparatus of claim 15, wherein the microfluidic device includes an alignment feature and the interface array includes a corresponding alignment feature.

24. The electrode alignment apparatus of claim 15, wherein the base unit includes a heater.

25. The electrode alignment apparatus of claim 15, wherein the electrode block is constructed of polypropylene.

26. The electrode alignment apparatus of claim 15, further comprising a coupling assembly disposed between the base unit and the electrode block assembly.

27. The electrode alignment apparatus of claim 26, wherein the coupling assembly is a hinge.

28. The electrode alignment apparatus of claim 15, wherein the base unit is a plate.

29. The electrode alignment apparatus of claim 28, wherein the microfluidic device attachment region is a raised platform that extends from a top surface of the base unit.

30. The electrode alignment apparatus of claim 29, wherein a registration feature is disposed on the raised platform.

31. The electrode alignment apparatus of claim 15, wherein the electrode block includes a rocker member having an arcuate bearing surface that contacts a surface of the interface array platform when the interface array is coupled to the interface array platform.

32. The electrode alignment apparatus of claim 15, further comprising a stop feature disposed on the electrode block assembly.

33. The electrode alignment apparatus of claim 15, further comprising a stop feature disposed on the base unit.

34. An electrode alignment system, comprising:

a base unit including a microfluidic device attachment region;

an electrode block assembly including an interface array platform and an interface array, said interface array including an electrode block and a plurality of electrode pins, wherein the interface array is coupled to the interface array platform such that the interface array is movable in three dimensions with respect to the interface array platform; and a microfluidic device mounted to the microfluidic device attachment region.

35. The electrode alignment system of claim 34, wherein the microfluidic device includes an alignment feature configured to engage alignment features of the electrode block assembly.

36. The electrode alignment system of claim 34, further comprising a stop feature disposed on the microfluidic device.

37. A method of aligning electrodes with reservoirs of a microfluidic device comprising:

providing an electrode alignment apparatus in an open position, wherein the apparatus includes a base unit including a microfluidic device attachment region configured to support a microfluidic device; an electrode block assembly including an interface array platform, and an interface array that includes an electrode block and a plurality of electrode pins, wherein the interface array is coupled to the interface array platform such that the interface array is movable in three dimensions with respect to the interface array platform and the electrode block assembly is movable between the open position and a closed position with respect to the base unit;

mounting a microfluidic device onto the microfluidic device attachment region, the device having multiple fluid reservoirs;

moving the electrode block assembly from the open position to the closed position such that the interface array automatically adjusts its position with respect to the interface array platform such that the electrode pins align with the reservoirs.

* * * * *